Figure 1:
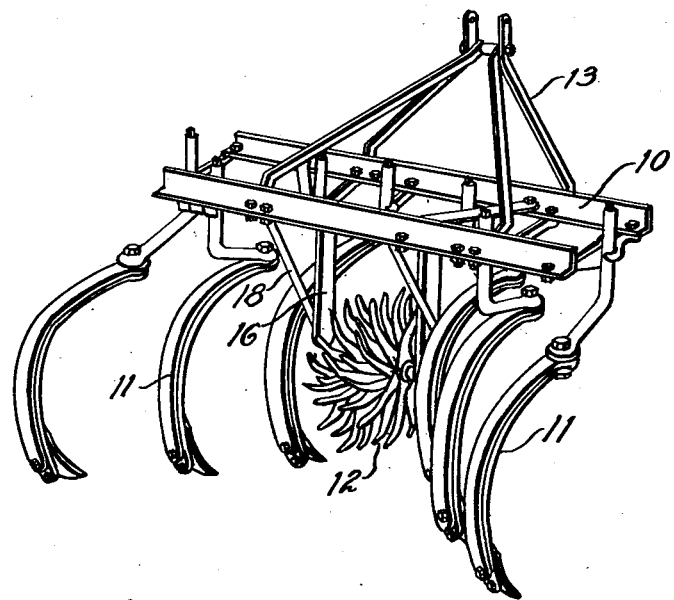

July 22, 1952 — W. E. LATTA — 2,604,026
ROTARY HOE
Filed Oct. 28, 1947 — 3 Sheets-Sheet 1

INVENTOR.
WILLIAM E. LATTA
ATTORNEYS.

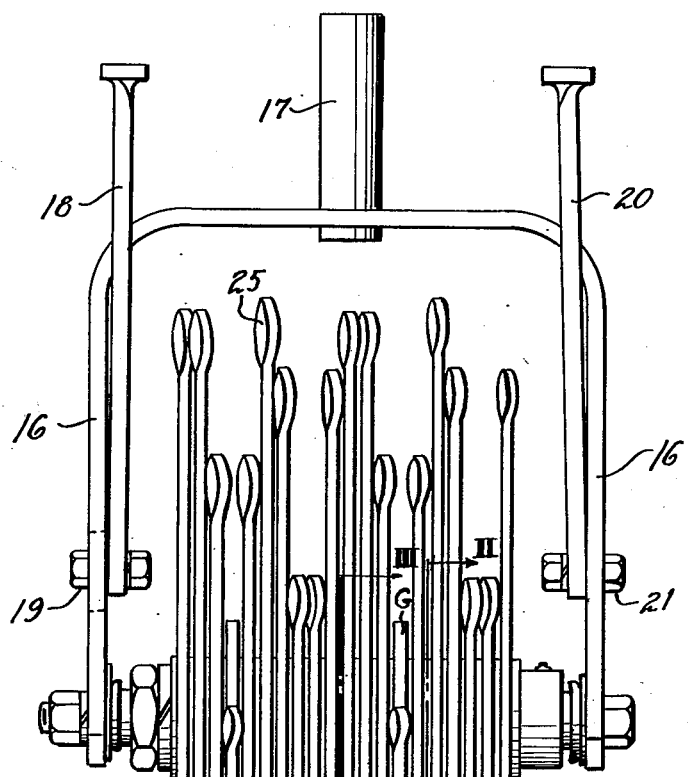
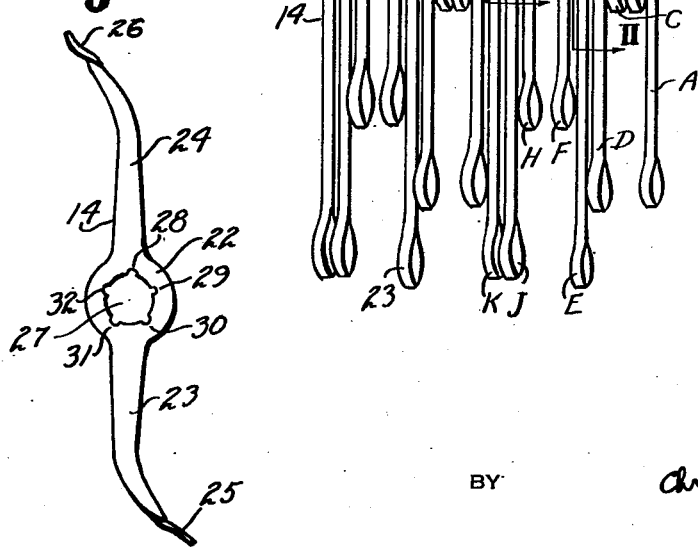

July 22, 1952  W. E. LATTA  2,604,026
ROTARY HOE
Filed Oct. 28, 1947  3 Sheets-Sheet 3
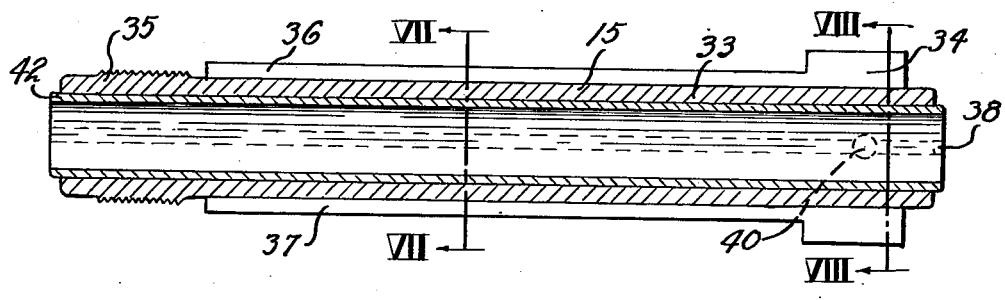
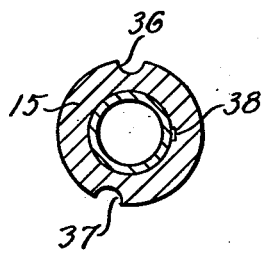 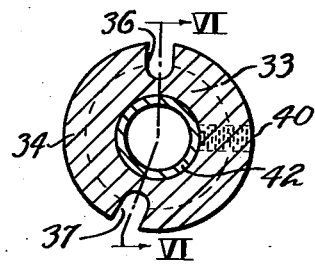 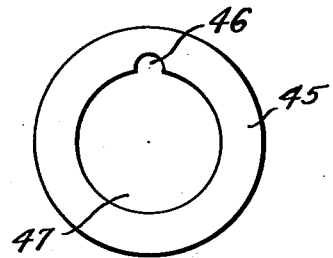
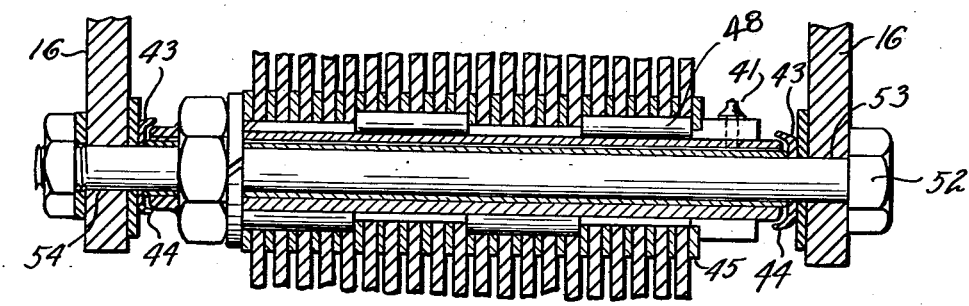
INVENTOR.
WILLIAM E. LOTTA
BY  *Christy, Parmelee & Strickland*
ATTORNEYS.

Patented July 22, 1952

2,604,026

UNITED STATES PATENT OFFICE 2,604,026

ROTARY HOE

William E. Latta, Aliquippa, Pa., assignor to Pittsburgh Forgings Company, Coraopolis, Pa., a corporation of Delaware Application October 28, 1947, Serial No. 782,524

4 Claims. (Cl. 97—212)

My invention relates to farming machinery and more particularly to cultivating implements commonly known as rotary hoes, and has to do specifically with the construction of the rotary hoe wheels which commonly form a part of such implements. Such rotary hoe wheels are mounted between spaced tines of a cultivator, and are useful for shallow cultivation and for uprooting young weeds.

These rotary hoe wheels include a plurality of radially extending teeth or blades having a hub portion which in turn is mounted on a rotatable shaft. The wheels turn during the forward movement of the implement so that the radially extending teeth enter the soil to a limited depth, loosens it up and uproots small weeds that may be growing.

The rotary hoe wheels heretofore made have been such as do not lend themselves to easy manufacture and are such that the blades are not readily assembled or replaced by the use of simple tools in daily use. The hoe constructed according to my invention is formed from simple and easily made parts and the blades are readily replaced if desired, by relatively simple operations.

One of the objects of my invention is to provide a rotary hoe wheel which includes a plurality of separate blade members mounted on a common shaft in such manner that if a blade becomes unduly worn or breaks it may be readily removed and replaced by another blade.

Another object is to provide a minimum number of blades consistent with good engineering practice so that the manufacturing process is simplified.

A further object of my invention is to provide a mechanically simple rotary wheel assembly which can be easily and inexpensively manufactured and assembled.

I provide a central shaft on which the two bladed teeth are mounted against rotation relative to the shaft and angularly with respect to one another, and spaced a desired distance apart to give the cultivator effect desired. The shaft is rotatably received in supports connected in a suitable manner to the implement.

In the drawings wherein I have shown for purposes of illustration only the present preferred embodiment of my invention.

Figure 3:
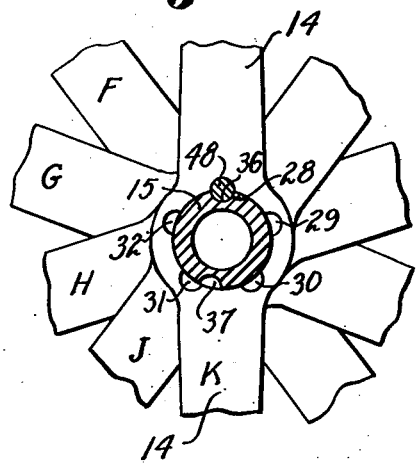
Figure 2:
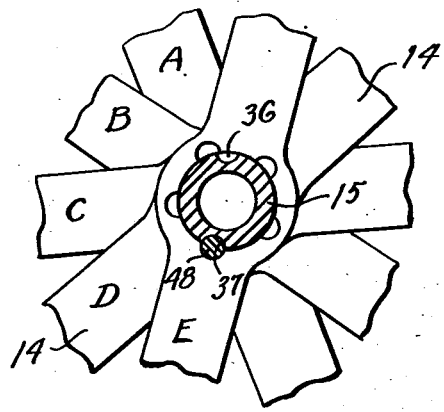

Figure 1 represents (on a scale smaller than that used in the other drawings) a conventional cultivator in perspective and showing a rotary hoe embodying my invention mounted between the tines of a cultivator, Figure 2 is a section along the line II—II of Figure 4 showing the hub portion of some of the teeth mounted on the common transverse shaft or axle, Figure 3 is a section similar to that of Figure 2 but along the line III—III of Figure 4, Figure 4 is a view in elevation from the rear of the rotary hoe, Figure 5 is a plan view of a hoe blade but to a scale smaller than that of the other drawings, Figure 6 is a view in longitudinal section of the hub shaft and sleeve along the line VI—VI of Figure 8, Figure 7 is a cross sectional view along the line VII—VII of Figure 6, Figure 8 is a cross sectional view along the line VIII—VIII of Figure 6, Figure 9 is a plan view of a blade spacer, and Figure 10 is an assembly view of a portion of the rotary hoe mostly in section and showing the relationship of assembled parts.

In Figure 1 of the drawings there is represented a perspective view of a conventional cultivator which includes a frame 10, to which is connected a series of tines 11 and a rotary hoe 12 which embodies my invention. A hitching device 13 whereby the cultivator may be moved and controlled from a suitable source of tractive power is mounted on the top of the frame 10.

The hoe which embodies my invention includes a series of blades 14 spaced apart and rigidly mounted on a round shaft or axle 15. The shaft 15 is rotatably mounted adjacent the ends of an inverted U-shaped bracket or arch support 16 from the closed upward end of which and centrally thereof a stem or shank 17 projects upwardly and is adjustably received by the frame 10. A brace 18 is adjustably connected at its lower end to one side of the bracket 16 by a bolt and slot connection 19 and at its upper end it is secured to the frame 10. A similar brace 20 is adjustably connected at its lower end to the other side of the bracket by a bolt and slot connection 21 and at its upper end it is secured to the frame 10. This arrangement for connecting the hoe to the frame provides for vertical adjustment of the hoe relative to the frame and connected tines.

Figure 5 represents the blades or teeth 14 I employ and which are preferably formed from steel plate as by a punching or die cutting operation. Each blade consists of a hub portion 22 and two radially tapered fingers 23 and 24 which project diametrically from opposite sides of the hub for a portion of their lengths. Each finger partway of its length is curved in a counterclockwise direction as viewed in Figure 5. The tip 25 of finger 23 and the tip 26 of finger 24 are slightly rounded and are twisted as shown through an angle of about 45° to the plane of the blades. The twisting operation cold works the tips and thereby increases the toughness and stiffness of the tips and I prefer this construction although it is not necessary that the teeth be so shaped.

The blade hub 22 has a circular opening 27 in the center portion thereof and the edges of this opening are shaped to provide five equally spaced semicircular keyways 28, 29, 30, 31 and 32 respectively. These keyways, as will appear, co-operate with complementary semicircular keyways formed in the shaft 15 to receive keys which will secure the blades or teeth 14 against rotation relative to the shaft 15. I prefer to form the hub openings and keyways by a punching operation.

The shaft 15 on which the blades are mounted so as to rotate therewith is best shown in Figures 6 through 10. The shaft consists of a generally circular hollow portion 33 having at one end an abutment 34 and at the other end a screw threaded portion 35 of less diameter than the central portion. Two keyways 36 and 37 extending lengthwise are formed in the central portion and extend through the end portion 34. The angle between the keyway or slot 36 and the keyway or slot 37 measured clockwise as viewed in Figure 7 is about 198°. On the inside of shaft 15 a grease slot or groove 38 is cut into the shaft and extends from end to end. A hole 40 extends through abutment 34 and the shaft wall and terminates in grease slot 38. The hole is threaded to receive a grease fitting 41.

A tubular metal sleeve 42 is rotatably received in the shaft 15, and protrudes a short distance beyond each end of the shaft. In the complete wheel assembly the ends of the sleeve bear against dust caps 43 (Figure 10) which are cuplike in shape and which have a hollow center portion of the same inner diameter as that of the sleeve 42, and an edge flange 44 which projects over and encircles the outer end surfaces of the shaft. This provides a seal, which keeps dirt and dust out and seals in the lubricating grease which is used between the shaft and the sleeve.

Figure 9 illustrates a spacer 45 which is made from sheet metal in the form of a hollow ring, having in the inside thereof a semicircular cut out portion 46, of a size corresponding to the size of the keyways 28 etc., formed in the center portion of the blade hubs 22. The central opening 47 is large enough to enable the spacers to be slipped over the central portion 33 of the shaft 15. This spacer of any desired thickness is used between each blade of the assembly.

The numeral 48 designates a hub key which has a diameter such as to closely fit in the circular keyway which is formed when one of the semicircular keyways in the blade hub 22, e. g., 28 is in alignment with one of the shaft keyways 36 or 37. The key 48 which I use in my presently preferred assembly is five times as long as the thickness of the hub 22 and spacer 45 combined.

The rotary wheel or hoe is assembled in the following manner. A spacer 45 is placed around the portion 33 of the shaft and against the abutment or ridge 34. A blade 14 is placed against the spacer 45 and with the keyway 31 in the blade hub 22 lined up with the keyway 37 in the shaft 15. A key 48 is placed in position in the circular space formed by the two complementary keyways, one, 31, in the blade hub, the other, 37, in the shaft. Another spacer 45 is placed on the shaft so that slot 46 embraces key 48 and the next blade is dropped in position so that the keyway 29 is slid over and along the key 48 to contact the spacer 45. This places the longitudinal axes of the blades at an angle of 36° to each other. The assembly is illustrated in Figures 2 and 3 in which groups of five blades each are arranged in two different step by step relationships.

In Figure 2, which shows the first group of five blades, the keyways of the blades are lined up with shaft keyway 37 in the following order:

| Blade: | Blade keyway |
|---|---|
| A | 31 |
| B | 29 |
| C | 32 |
| D | 30 |
| E | 28 |

Figure 3 shows the second blade group disposed on the shaft next to the group shown in Figure 2, with the blade keyways lined up with shaft keyway 36, as follows:

| Blade: | Blade keyway |
|---|---|
| F | 31 |
| G | 29 |
| H | 32 |
| J | 30 |
| K | 28 |

The next or third group of five blades and spacers 45 is spaced equally around keyway 37 in the same order and blade position as that shown in Figure 2, and with the first blade A of this group at an angle of 18° with the blade F of the second group. The fourth group of blades and spacers is like group two and spaced around the key 48 in slot 36. A section of the complete blade assembly is shown in Figure 10. The number of groups can be more or less than four.

The blades in each group are angularly disposed 36° apart while the groups themselves are set 18° apart with each other. This small angular spacing of blades is possible with one type of blade and with a shaft having two spaced-apart keyways. With five slots in each of the blade hubs the blades in each group can be arranged at an angle of 36° relative to each other and with two slots in the shaft each group can be arranged at an angle of 18° with the adjoining group. This is a simple, strong, relatively inexpensive and desirable system of blade spacing.

The shaft 15 with its assembled blades and spacers is placed around sleeve 42. Dust caps 43 are positioned on each end of the sleeve so as to bear against the sleeve ends and to overlap the ends of shaft 15. This assembly of shaft, blades, spacers, sleeve, and dust caps is placed between the ends of bracket 16 and a bolt 52 is passed through an opening 53 in bracket 16 through the hoe assembly and through an opening 54 in the opposite bracket 16. A nut on the end of the bolt 52 projecting through the opening 54 and appropriate washers complete the hoe structure. In practice the nut is tightened so that the sleeve 42 is held immovable while the shaft 15 and its blades can freely rotate around the shaft.

It will have been observed that by the use of five slots in the eye portion of the blades, the blades having diametrically opposed fingers, it is possible to arrange the blades in ten different positions around one shaft keyway, so that the fingers of the blades are only 36° apart. I have discovered that by providing an uneven number of eye portion keyways that it is possible to have a blade spacing equal to 360° divided by twice the number of keyways or slots. Thus where five keyways are provided the spacing apart of each blade is 360° divided by 10, i. e., 36°. This is in contradistinction to the situation where an even number of slots are provided, in which case the blade finger spacing will be 360° divided by the number of slots. Thus a blade with six slots would have the fingers only 60° apart, whereas with only five slots, the finger spacing is only 36°. This discovery enables the blade spacing to be relatively small when a relatively small uneven number of slots is provided. A smaller number of slots enables a blade to be made more cheaply than one with a larger number of slots. A similar result would be obtained when the blades have an uneven number of fingers and an uneven number of slots in the eye portion.

This structure can be readily disassembled so that any particular blade or blades or all the blades can be easily replaced should the occasion demand it. And only one type blade is needed for any position.

The number of keyways in the hub of the blades can be varied as desired and likewise more than two spaced-apart keyways may be formed in the hub shaft. It is thus possible to provide various angular spacing of the blades and relative angular spacing of the groups as desired. The blades need not be arranged in the same groups as we have illustrated nor need the blades be arranged in groups. Such changes are contemplated in my invention.

While I have described and illustrated the presently preferred embodiment of my invention, it will be understood that this is by way of example only and that the invention may be otherwise embodied and practiced within the scope of the following claims.

I claim:

1. An agricultural implement comprising a rotatable central support and a group of similar implements thereon and keyed thereto, the implements having an eye therethrough in which the central support has a sliding fit, each one being angularly displaced with respect to the adjacent ones by equal angular distances, each implement having a plurality of equally spaced keyways in the eye thereof, another similar group of implements on the support similarly arranged but angularly offset in equal amounts to the implements of the first group, said support having a pair of keyways therein less than 180° apart, all of the implements of one group being keyed by a single key in one keyway on the support and all of the implements of the other group being keyed to the support by a single key in the other keyway of the support.

2. A hoe wheel including a shaft, and blades arranged angularly around the shaft, said shaft having only two parallel keyways longitudinally of the shaft, each blade having two diametrically opposed fingers, an eye portion centrally of the blade, a plural number of slots in the eye portion, a group of the blades being arranged on the shaft with the slots in alignment with one of the keyways, a key embedded in the slot and in the keyway, the blades being spaced angularly so that the angle between each successive blade is equal to 360° divided by twice the number of slots, and a second group of the blades keyed to the shaft with the slots and the second of the keyways in alignment, the second of said keyways being arranged on the shaft so that a radius from the second keyway makes an angle with a diameter which passes through the other keyway of less than the aforesaid angle between each successive blade.

3. An agricultural implement comprising a rotatable hollow shaft and a group of similar blades thereon and keyed thereto, the blades having an eye therethrough in which the hollow shaft has a sliding fit, each one being angularly displaced with respect to the adjacent ones by equal angular distances, each blade having an uneven number of equally spaced keyways in the eye thereof, another similar group of blades on the shaft similarly arranged but angularly offset to the blades of the first group, said shaft having a pair of longitudinal keyways therein displaced by an angle of less than 180°, all of the blades of one group being keyed by a single key in one keyway on the shaft support and all of the blades of the other group being keyed to the shaft by a single key in the other keyway of the shaft.

4. In an agricultural machine, a hoe wheel including a rotatable shaft, said shaft having a pair of parallel keyways extending longitudinally thereon, a support for said shaft, a plurality of similar blades each having a central eye in which said rotatable shaft is receivable, each blade having slots at spaced angular intervals about the eye therein for alignment with one of the keyways on said shaft, the angular position of each blade on said shaft being determined by aligning one of said slots with a selected keyway on said shaft, and keys insertable into said keyways and aligned slots to hold said blades in the selected positions about said shaft, said keyways being spaced from each other an angular distance comprising a fractional part of the angular distance between adjacent slots in one of said eyes, the provision of two keyways and the angular spacing thereof being effective thereby to multiply the number of possible angular positions in which one of said blades may be mounted relative to said shaft.

WILLIAM E. LATTA.

REFERENCES CITED

The following references are of record in the file of this patent:

UNITED STATES PATENTS

| Number | Name | Date |
|---|---|---|
| 56,631 | Stiles | July 24, 1866 |
| 662,366 | Payne | Nov. 20, 1900 |
| 948,820 | Mosher | Feb. 8, 1910 |
| 957,722 | Walker | May 10, 1910 |
| 1,203,091 | Autry | Oct. 21, 1916 |
| 1,407,417 | Huelves | Feb. 21, 1922 |
| 1,491,865 | Kelley | Apr. 29, 1924 |

FOREIGN PATENTS

| Number | Country | Date |
|---|---|---|
| 210,892 | Germany | June 18, 1909 |
| 512,817 | France | Oct. 23, 1920 |